United States Patent [19]

Bouchard et al.

[11] 4,228,482
[45] Oct. 14, 1980

[54] MULTILAYER CERAMIC CAPACITORS

[75] Inventors: Robert J. Bouchard, Wilmington, Del.; Lothar H. Brixner, West Chester, Pa.; Michael J. Popowich, Lewistown, N.Y.

[73] Assignee: E. I. Du Pont de Nemours and Company, Wilmington, Del.

[21] Appl. No.: 860,211

[22] Filed: Dec. 13, 1977

Related U.S. Application Data

[63] Continuation-in-part of Ser. No. 757,097, Jan. 5, 1977, abandoned, which is a continuation of Ser. No. 594,281, Jul. 9, 1975, abandoned.

[30] Foreign Application Priority Data

Jul. 7, 1976 [CA] Canada ................................. 256456

[51] Int. Cl.$^2$ ............................................. H01B 3/12
[52] U.S. Cl. ................................. 361/321; 106/73.3; 252/62.9; 361/313
[58] Field of Search ............... 361/321, 313; 252/62.9; 106/73.3; 423/598

[56] References Cited

U.S. PATENT DOCUMENTS

| | | | |
|---|---|---|---|
| 2,919,483 | 1/1960 | Graveley | 361/321 |
| 3,472,777 | 10/1969 | Brixner | 252/62.9 |
| 3,757,177 | 9/1973 | Buehler | 361/321 |
| 3,809,973 | 5/1974 | Hurley | 361/321 X |
| 3,909,327 | 9/1975 | Pechini | 361/321 |
| 4,048,546 | 9/1977 | Bouchard et al. | 361/321 |

FOREIGN PATENT DOCUMENTS 2130903   10/1972   France ................................. 252/62.9

OTHER PUBLICATIONS

Smolenski et al., Soviet Physics–Solid State, 3,714 (1961).
Von Hippel, Dielectric Material & Applications, Wiley, 1963, N.Y., N.Y., pp. 272-273.

*Primary Examiner*—Richard R. Kucia

[57] ABSTRACT

Multilayer capacitors of good electrical properties can be made by firing, in air at low temperatures, certain modified lead titanate dielectric compositions. The dielectric compositions have the formula $$(Sr_xPb_{1-x}TiO_3)_a(PbMg_{0.5}W_{0.5}O_3)_b$$

wherein
x is 0–0.10,
a is 0.35–0.5,
b is 0.5–0.65, and
a plus b equals one.

10 Claims, 1 Drawing Figure

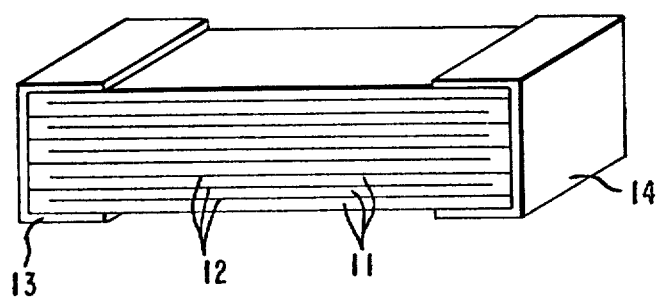

MULTILAYER CERAMIC CAPACITORS

CROSS REFERENCE TO RELATED APPLICATIONS

This is a continuation-in-part of application U.S. Ser. No. 757,097, filed Jan. 5, 1977, which in turn was a continuation of application U.S. Ser. No. 594,281, filed July 9, 1975, now both abandoned.

BACKGROUND OF THE INVENTION

This invention relates to electrical capacitors, and more particularly to monolithic capacitors made by lamination and firing of electroded dielectric layers.

Multilayer monolithic capacitors comprise a multiple number of dielectric layers, at least some of which bear metallizations (electrodes) in desired patterns. Such capacitors are made from green (unfired) tape of ceramic particles held together with an organic binder, by cutting pieces of tape from a sheet of tape, metallizing some of the tape pieces, stacking and laminating the pieces of tape, and firing the resultant laminate to drive off organic binders and any solvents and form a sintered (coherent) body, which is termed monolithic. Rodrieguez et al. U.S. Pat. No. 3,456,313 discloses a process for making them. FIG. 1 of Fabricius U.S. Pat. No. 3,223,905 shows a multilayer capacitor, which may be of alternating palladium and barium titanate layers.

Metallizations useful in producing conductors for multilayer capacitors normally comprise finely divided metal particles, applied to dielectric substrates in the form of a dispersion of such particles in an inert liquid vehicle.

Monolithic multilayer capacitors are typically manufactured by co-firing barium titanate formulations and conductive electrode materials in oxidizing atmospheres at temperatures of 1200°–1400° C. This process yields durable, well-sintered capacitors with high dielectric constant, e.g., greater than 1000. However, firing under these conditions requires an electrode material with high melting point, good oxidation resistance at elevated temperatures, sinterability at the maturing temperature of the dielectric, and minimal tendency to interact with the dielectric at the sintering temperature. These requirements normally limit the choice of electrode materials to the noble metals platinum and palladium, or to alloys of platinum, palladium, and gold.

Significant savings in electrode costs could be realized if dielectric materials could be modified to (1) yield good dielectric properties (high dielectric constant and low dissipation factor) after firing in reducing atmospheres, so that base metals could be used as electrodes, and/or (2) sinter at temperatures of 950° C. or lower so that silver, which is significantly less costly than the other noble metals but has a lower melting point (962° C.), could be used in electrode formation.

Attempts have been made to modify barium titanate ceramics so that they may be fired in reducing (e.g., hydrogen) or inert (e.g., argon, nitrogen) atmospheres. The use of this approach has been somewhat limited in that the electrical properties, e.g., dielectric constant, dissipation factor, temperature coefficient of capacitance, etc., are compromised as compared with those of conventional air-fired compositions. In addition, maintaining an inert or reducing atmosphere involves an additional production cost as compared to firing in air. Exemplary of this approach is Buehler U.S. Pat. No. 3,757,177, disclosing capacitors of base metal electrodes (e.g., Ni, Co, Fe) and modified barium titanate ($MnO_2$, $Fe_2O_3$, $CeO_2$, $CaZrO_3$) fired in an inert atmosphere at about 1300° C. (col. 3, lines 33–34). Even with these high firing temperatures and the expense of firing in an inert atmosphere, the highest dielectric constant reported there is 1800 (col. 3, line 67).

Several attempts have been made to reduce the maturing temperature of dielectrics by mixing high temperature ferroelectric phases (titanates, zirconates, etc.) with glasses which mature at relatively low temperatures. Examples of this approach are given in Maher U.S. Pat. No. 3,619,220; Burn U.S. Pat. No. 3,638,084; Maher U.S. Pat. No. 3,682,766; and Maher U.S. Pat. No. 3,811,937. The drawback of this technique is that the dilution effect of the glass often causes the dielectric constant of the mixture to be relatively low, in the 25–200 range.

Another technique for lowering the sintering temperature of titanate-based dielectrics is by the use of "sintering aids." Additions of bismuth oxide or bentonite to barium titanate lowers the maturing temperature to about 1200° C. (Nelson et al. U.S. Pat. No. 2,908,579). Maturing temperatures of 1200°–1290° C. may be attained by addition of phosphates to titanates as described in Thurnauer et al. U.S. Pat. No. 2,626,220. However, in each of these cases, the decrease in maturing temperature is not sufficient to permit the use of co-fired silver electrodes and dielectric properties are often degraded.

There exists a need for a composition which can produce a high dielectric constant (e.g., 1000 or above) and low dissipation factor (e.g., less than 5%, preferably less than 3%) and sinters in air at low temperatures (e.g., less than 1000° C. or even 950° C. or less). This would permit co-firing with silver or palladium/silver electrodes and hence would greatly reduce the cost of high dielectric constant multilayer capacitors.

N. N. Krainik et al. (Soviet Physics-Solid State, 2, 63–65, 1960), report solid solutions between, inter alia, $PbTiO_3$, and $PbMg_{0.5}W_{0.5}O_3$. Apparently a wide range of compositions, with 0–80% $PbTiO_3$, was investigated (see FIG. 2). Firing was carried out in an atmosphere of PbO vapor, which precludes practical commercial applicability. No suggestion was made as to the manufacture of multilayer capacitors. In a second article from the same laboratory, G. A. Smolenskii et al. (Soviet Physics-Solid State 3, 714, 1961) report investigating certain solid solutions, including those of Krainik et al. Firing was similarly done in PbO. Phase transitions are discussed. In what is apparently a third article in this series, A. I. Zaslavskii et al. (Soviet Physics-Crystallography 7, 577, 1963), X-ray structural studies are reported.

Brixner U.S. Pat. No. 3,472,777 discloses the manufacture of ferroelectric ceramic discs by a two step firing process. Each firing step is taught to occur in the range 800°–1200° C., in air. In the sole example firing was at 1050° C. Brixner discloses various dielectric compositions such as $PbMg_{1/3}Ti_{1/3}W_{1/3}O_3$, $Pb_{0.8-0.9}Sr_{0.1-0.2}Mg_{1/3}Ti_{1/3}W_{1/3}O_3$ and Y-containing compositions.

Incorporated by reference herein is Sheard U.S. Pat. No. 3,872,360, issued Mar. 18, 1975, relevant to the preparation of monolithic multilayer capacitors.

SUMMARY OF THE INVENTION

This invention is a monolithic capacitor fired in air at 1050° C. or less, having a dielectric constant of at least 1000 and a dissipation factor of less than 5%, comprising a plurality of superimposed alternating layers of a dielectric composition and metal electrodes bonded together into a unitary body, the electrodes being substantially embedded in the dielectric, the dielectric composition having the formula $$(Sr_xPb_{1-x}TiO_3)_a(PbMg_{0.5}W_{0.5}O_3)_b$$

wherein x is 0–0.10, a is 0.35–0.5, b is 0.5–0.65, and a plus b equals one. Preferred capacitors are those where, in the dielectric composition, a is 0.35–0.45 and b is 0.55–0.65. The ceramic multilayer capacitors of this invention can exhibit excellent aging characteristics at room temperature, i.e., the rate of change in capacitance with time. Thus, the change in capacitance with time, even at high dielectric constants, such as 4000 or greater, can be about 1.5% or less per decade in hours, the term "decade" of course referring to an order of magnitude in time measured in hours, e.g., the interval between 10 and 100 hours, 100 and 1000 hours, etc.

In one preferred embodiment, there is no strontium in the dielectric composition, that is, x is 0. In other preferred embodiments, strontium is present such that in the dielectric composition x is 0.01–0.08. Preferred capacitors are those having silver electrodes or Pd/Ag electrodes. Preferably, for reasons of economy, the Pd/Ag electrodes comprise no more than 20% Pd, based on the total weight of Pd and Ag.

Another embodiment of the invention is a method of making such monolithic capacitors comprising a plurality of superimposed alternating layers of a dielectric composition and metal electrodes bonded together into a unitary body, the method comprising the steps of (a) calcining in air, at a peak temperature in the range 750°–900° C., for at least 5 minutes, preferably for at least 15 minutes, and usually for 0.5–8 hours, a mixture of oxides or precursors thereof in such relative proportions to produce the desired dielectric composition described above, then comminuting the resultant calcined product to the desired fineness (usually substantially all the particles are 20 microns or less in largest dimension), (b) preparing an unsintered flexible ceramic dielectric tape of the calcined product of step (a) in an inert liquid vehicle therefor, (c) electroding two or more such tapes in the desired pattern with a dispersion of metal powder in an inert vehicle therefor, (d) laminating a multiple number of such tapes as desired, the top layer being an unelectroded tape, and (e) sintering the resultant laminate in air for at least 0.25 hour, preferably at least 0.5 hour, at a temperature in the range 900°–1050° C. to form a unitary monolithic multilayer capacitor having a K of at least 1000 and a dissipation factor of no more than 5%.

Where the metal powder of step (c) is silver powder, the sintering temperature of step (e) is preferably in the range 900°–950° C. Where the metal powder of step (c) is Pd/Ag, the sintering temperature of step (e) is normally in the range 900°–1050° C. A preferred method is that wherein the calcining step (a) is conducted for 0.25–8 hours and the sintering of step (e) is conducted at 900°–1050° C. for 0.5–4 hours.

When it is stated herein that a physical property of a multilayer capacitor (such as aging rate, dielectric constant, dissipation factor) can be obtained according to this invention, this of course refers to capacitors which have been otherwise properly prepared. Thus, as is well known in the art, electrodes which are improperly printed, dielectric layers which are discontinuous, inadequately laminated or diced capacitors, etc. can all result in inadequate capacitors. Hence, when a property is referred to, it does not comprehend capacitors which for other reasons would be discarded. Furthermore, the physical properties referred to are average physical properties for a lot of capacitors prepared together.

BRIEF DESCRIPTION OF THE DRAWING

In the single FIGURE of the drawing, which shows on an enlarged scale a monolithic capacitor, 11 indicates layers of dielectric material, 12 indicates buried electrode layers and 13 and 14 indicate terminal electrodes which join electrically alternating internal electrodes along opposed edges of the capacitors. Through these terminal electrodes the capacitors are connected into the desired electrical circuit.

DETAILED DESCRIPTION

The essential feature of the present invention is the use of the dielectric compositions described herein in the manufacture of multilayer monolithic capacitors. The use of this composition permits the formation of capacitors of excellent characteristics, although fired at low temperatures in air.

The dielectric of the present invention has the final composition set forth above. That final composition may also be expressed as follows:

$$Sr_{0-0.10}Pb_{0.90-1.0}Ti_{0.35-0.50}Mg_{0.25-0.325}W_{0.25-0.325}O_3,$$

the total of (Sr and Pb) being 1.0 and the total of (Ti and Mg and W) being 1.0. It is well known that in dielectric materials of the perovskite structure the amount of oxygen may vary from the stoichiometric amount. These dielectric compositions may be prepared from the oxides of strontium, lead, titanium, magnesium, and tungsten, or from precursors thereof such as carbonates, hydroxides, nitrates, etc. Lead, magnesium, and strontium are conveniently supplied as carbonates, whereas titanium and tungsten are conveniently supplied as oxides. Lead oxide (PbO) also is a convenient source of lead and strontium nitrate is a convenient source of strontium. Mixtures of oxides and precursors thereof may, of course, be employed.

The oxides or precursors are mixed together using conventional techniques (e.g., ball milling mortar and pestle, etc.) and then calcined in air (or an oxygen atmosphere) at a temperature not in excess of about 900° C. Calcining normally occurs at a temperature in the range 750°–900° C. for at least 5 minutes, preferably at least 15 minutes, and usually for 0.5–8 hours. The preferred duration of calcining will be dependent upon the particular starting materials employed, e.g., lead oxide versus lead carbonate, etc.; the proportions of starting materials; the calcining temperature; etc. As is well known, with lower temperatures longer duration of calcining will usually be employed. Calcining for more than 8 hours does not appear to cause any significant property improvements in the capacitors of this invention. Therefore, calcining may be conducted for longer than 8 hours yet still be within the purview of this invention.

Following the calcining step, the calcined product may then be milled to the desired fineness. Normally, the calcined product is reduced in size so that substantially all the particles are 20 microns or less in largest die dimension. Usually the dielectric powders employed in preferred embodiments will have surface areas in the range 0.2-5 m.$^2$/g.

The calcined product is then dispersed in an inert liquid vehicle and cast using conventional techniques as a tape on a flat surface. The vehicle may be any of those conventionally used to form tapes, normally comprising polymeric components and organic liquids, such as that disclosed in U.S. Pat. No. 3,757,177, that is, an organic binder of acryloid plastic dispersed in ethylene dichloride, the binder often comprising about 45% of the total weight of the sheet. Individual dielectric pieces are punched out of the tape.

The green (unsintered) dielectric tape is then electroded with a dispersion of a metal in a temporary vehicle therefor, the electroding being in the desired configuration. Such vehicles may be any of those commonly used in the art, including those disclosed in Sheard U.S. Pat. No. 3,872,360, which is incorporated by reference herein. In the present invention the preferred metal powder is silver or palladium/silver, there normally being no more than 20% palladium based upon the total weight of palladium and silver.

After printing the electrode material on the green ceramic, the resulting electroded pieces are either then dry or wet stacked to the appropriate number of layers, pressed (up to 5000 psig with or without heat), optionally diced and then fired.

A typical firing cycle for multilayer capacitors comprises two phases. The first, called bisquing normally reaches a peak temperature not in excess of 500° C. The duration of this phase depends to some extent on the number of layers in the laminate. The purpose is the non-catastropic removal of vehicle (solvent and binder) both in the electrodes and in the green dielectric sheets. After this is accomplished, a rapid (several hours or less) heat up to the desired peak or soaking temperature normally occurs, for the purpose of maturing or sintering the ceramic dielectric.

In the present invention a principal advantage is the ability of the dielectric to be sintered in air at temperatures below 1050° C. versus 1400° C. currently used. The actual sintering temperature employed depends upon the specific composition employed, the electrode composition employed, and the properties desired of the final capacitor. Sintering is conducted at a temperature in the range 900°-1050° C., for a period not less than 0.25 hour (preferably at least 0.5 hour), nor more than 4 hours.

In the following examples and elsewhere in the specification and claims, all parts, percentages, and ratios are by weight unless otherwise stated.

EXAMPLES 1-6

Three precalcined dielectric compositions were prepared as follows from the materials indicated in Table I.

The indicated starting materials for dielectric (reagent grade) were mixed together in a ball mill with 350 cc. water for about 1 hour (total solids weight about 400 g. of starting material). The milled samples were then calcined in air in mullite at 875° C. for 2 hours (raised from room temperature to 875° C. over 3 hours and held), and then crushed to minus 48 mesh and finally milled in a ball mill as before for 0.5 hour. The final particle size was such that substantially all the particles were less than 20 microns in largest dimension.

Flexible tapes were prepared by mixing 100 g. dielectric powder with 125 g. of a vehicle to form a slurry. The tape vehicle was acryloid-based and comprised 40.3% acryloid B7 (Rohm and Haas), 2.8% santicizer 160 (Central Solvent Co.), 0.2% of a rosin solution (10% rosin in isopropyl alcohol), 0.3% of a glycerine solution (10% glycerine in isopropyl alcohol) and 56.4% trichloroethylene. The slurry was doctor-bladed on a flat plate using conventional techniques. The tape was dried at room temperature overnight to form green flexible tape about 1.5 mils (38 microns) thick.

TABLE I

| Dielectric Composition | Components (wt. in g.) | | | | Fired Composition |
|---|---|---|---|---|---|
| | PbCO$_3$ | MgCO$_3$ | TiO$_2$ | WO$_3$ | |
| A | 278.609 | 31.8393 | 21.1591 | 78.5688 | PbMgO . 325TiO . 350WO . 32503 |
| B | 280.667 | 29.7398 | 23.5708 | 73.0606 | PbMgO . 300TiO . 400WO . 30003 |
| C | 282.751 | 27.4639 | 38.0476 | 67.4696 | PbMgO . 275TiO . 450WO . 27503 |

Then the tape was cut into 0.5 inch (1.3 cm.) diameter discs, and electroded as desired with the electrode composition indicated below. Electrodes were printed through a 325-mesh screen (U.S. scale), the resultant dried print being about 0.6 mil (15 microns) thick.

Electroded discs were notched to provide for subsequent electrical contact. Two electroded discs were laminated with a third disc of tape by pressing at 5000 psig. (7.2 Kg/cm.$^2$) for a minute at room temperature, to provide two buried electrodes. Five such samples were prepared for each example.

The laminated, unfired samples were placed in an unheated box furnace (air atmosphere). The temperature was raised to 500° C. over 16 hours, then to the peak temperature (900° C., 950° C., or 1000° C., as indicated below), over 1 hour. The temperature was held at peak for 1 hour, then slowly cooled to room temperature over 2-3 hours.

Capacitance and dissipation factor (DF) were determined as follows. The fired multilayer capacitors were mounted in the jaws of an automatic RLC Bridge (General Radio Model No. 1683) where both capacitance and DF were automatically read. Knowing the capacitance, dimensions of electrode and thickness of the fired central dielectric layer, effective dielectric constant (K) was determined from:

$$K = \frac{\text{(Capacitance in Farads) (thickness in meters)}}{\text{(area of electrode in m.}^2\text{)} (E_o)}$$

where $E_o$ is $8.82 \times 10^{-12}$ Farads/m.

EXAMPLES 1-3

In Examples 1-3, the dielectric used was A, B, and C, respectively. Peak temperature was 950° C. The electrode material was a silver composition of 60 parts silver and 40 parts of a vehicle of 70% rosin solution (10% Hercules Staybelite 470 in 90% of a mixture of kerosine, naphtha and terpineol); 15% damar varnish solution (30% varnish in 70% "Solvesco 150" aromatic solvent); 4% dibutylphthalate; 11% naphtha; and 1% soya lecithin. Results are indicated in Table II.

EXAMPLES 4-6

In these examples dielectric B was used, with a Pd/Ag conductor composition. Peak firing temperature was varied, as indicated in Table III. The Pd/Ag ratio was 83.3% Ag/16.7% Pd, there being 60 parts metal and 40 parts of the same vehicle as Examples 1-3.

EXAMPLE 7

A strontium-containing dielectric of the following composition was prepared:

$$Pb_{0.96}Sr_{0.04}Mg_{0.27}Ti_{0.46}W_{0.27}O_3.$$

The starting materials, 9.025 g. $Sr(NO_3)_2$, 273.457 g. $PbCO_3$, 27.044 g. $MgCO_3$ (basic), 39.182 g. $TiO_2$, 66.734 g. $WO_3$, were mixed together in a ball mill with 350 cc. water for about an hour. The milled sample was then calcined in air at 600° C. for 5 hours and 875° C. for 2 hours, and then ground in a mortar and pestle to −48 mesh. Finally the sample was milled in a ball mill with 300 cc. water for 1 hour to −200 mesh.

Dielectric tapes were made as in Example 1 using 44.6 parts dielectric powder and 53.4 parts of a vehicle (22.3 parts acryloid BT, 1.6 parts Santicizer 160, 0.1 part of the rosin solution of Example 1, 0.2 parts of the glycerine solution of Example 1, and 31.2 parts trichloroethylene).

TABLE II

EXAMPLES 1-3

| Example | Dielectric | Cap. (pf.) | D.F. (%) | Electrode Area (cm.²) | Dielectric Thickness mils | Dielectric Thickness microns | K |
|---|---|---|---|---|---|---|---|
| 1 | A | 8950 | 1.3 | 0.1008 | 1.3 | | 3350 |
| 2 | B | 9450 | 3.1 | 0.1008 | 1.6 | | 4350 |
| 3 | C | 9650 | 4.2 | 0.1008 | 1.6 | | 4440 |

TABLE III

EXAMPLES 4-6

| Example | Firing Temp. (°C.) | Cap. (pf.) | D.F. (%) | Electrode Area (cm.²) | Dielectric Thickness mils | Dielectric Thickness microns | K |
|---|---|---|---|---|---|---|---|
| 4 | 900 | 2390 | 3.5 | 0.1008 | 1.6 | | 1100 |
| 5 | 950 | 8470 | 2.9 | 0.1008 | 1.6 | | 3900 |
| 6 | 1000 | 11163 | 0.85 | 0.1008 | 1.6 | | 5140 |

The dried green tape was 2.0 mils (50 microns) thick. Capacitors were prepared as in Example 2 (silver electrodes, 950° C. peak temperature for 1 hour). Capacitance was $6.74 \times 10^{-9}$ Farads, D.F. was 3.4%, fired thickness was $4.32 \times 10^{-5}$ meters, area was $1 \times 10^{-5}$ meters, and K was 3300.

EXAMPLES 8-10

A precalcined dielectric powder (D) having the composition $PbMg_{0.3}Ti_{0.4}Q_{0.3}O_3$ was prepared as before by mixing appropriate quantities of raw materials in a ball mill with water, calcining in air, and pulverizing.

Flexible tapes were prepared by mixing (ball milled for 4 to 6 hours) 200.0 g. dielectric powder (D) with 348.2 g. vehicle to form a slurry. The vehicle was acryloid based and contained 100.0 g. acryloid B7 (Rohm and Haas), 7.0 g. santicizer 160 (Monsanto), 0.4 g. of a rosin solution (10% rosin in isopropyl alcohol), 0.8 g. of a glycerine solution (10% glycerine in isopropyl alcohol) and 240.0 g. trichloroethylene. Additional trichloroethylene was sometimes added to adjust viscosity.

The slurry was doctor-bladed to form a tape as before and dried for 12-24 hours at about 25° C. and then in an oven at about 65° C. for 15-30 min. to give a green tape about 2 mils (50 microns) thick. Forty rectangular electrodes were then applied to a single tape using the electrode composition described below and a 270 mesh screen, and dried at about 70° C. for 15-30 min. The resultant dried electrode prints were about 0.3-0.5 mil thick.

Ten such electroded tapes (5 left-handed and 5 right-handed patterns) were then stacked alternately along with blank (unelectroded) top and bottom tapes in a 2-inch by 4-inch steel die. The stack was compacted by pressing at about 80° C. and about 3000 lb/in²., 5-7 min. at maximum temperature and pressure. The die and contents were allowed to cool under pressure. This compact was then cut on a dicing table to produce green unfired laminates. The laminates were then baked out at about 150° C. for 12-24 hours and then heated in a box furnace to 500° C. at a linear heating rate of about 20° C./hour, to remove organic materials before the firing step which consolidates the dielectric. The capacitors were then fired in the box furnace by raising the temperature from 500° C. to 970° in 1 hour and holding at 970° C. for 1 hour. The capacitors were allowed to cool in the furnace over 4 hours. The fired capacitors were terminated with a commercial glass-bonded silver composition (Du Pont No. 7713), and cured at 530° C. for 25 min. Leads were attached by dip soldering at about 225° C. in 62 Sn/36Pb/2Ag (weight %) solder, about 3-5 second dip. Any flux residue was removed using Du Pont 8529 flux remover, an organic solvent. Then capacitance and dissipation factor were measured as above.

In Examples 8-10 each of the electrode compositions comprised a metallic powder of 80Ag/20Pd (by weight). Pretreatment of the Ag/Pd prior to formation of electrode paste (roll milling or sintering) was varied but did not affect the aging rate of the capacitors significantly.

In Example 8 the electrode composition contained, by weight, 68.89 parts of metal powder and 31.11 parts vehicle, the vehicle containing 0.56 part soya lecithin, 1.19 parts terpineol, 6.61 parts rosin (Hercules Co. Staybelite resin), 2.00 parts ethyl cellulose (Hercules Co. T-200), 6.98 parts kerosene (198°-230° C. cut), 6.00 parts Phillips Petroleum Co. Soltrol 100 solvent, and 7.77 parts Phillips Petroleum Co. Soltrol 50 solvent.

The electrode composition for Example 9 contained, by weight, 60 parts metal powder and 40 parts vehicle. The vehicle contained, by weight, 0.50 part soya lecithin, 1.49 parts terpineol, 8.85 parts rosin (Hercules Co. Staybelite resin), 2.57 parts ethyl cellulose (Hercules Co. T-200), 10.04 parts kerosene (198°-230° C. cut), 7.06 parts Phillips Petroleum Co. Soltrol 100 solvent, and 9.49 parts Phillips Petroleum Co. Soltrol 50 solvent.

The electrode composition of Example 10 contained 56.53 parts of metal powder and 43.47 parts of a vehicle containing 0.48 parts soya lecithin, 1.47 parts terpineol, 8.29 parts rosin (Hercules Co. Staybelite resin), 2.49 parts ethyl cellulose (Hercules Co. T-200), 8.86 parts kerosene (198°-230° C. cut), 7.36 parts Phillips Petroleum Co. Soltrol 100 solvent, 9.59 parts Phillips Petroleum Co. Soltrol 50 solvent, 4.15 parts Exxon Solvesso 150 solvent, and 0.78 part butyl carbitol acetate.

Table IV sets forth average initial dielectric constant (K), capacitance (C) and dissipation factor (DF) for the number of samples indicated, as well as average percent change in capacitance ($\Delta C$) per decade in hours (aging rate). A negative value indicates a decrease in capacitance upon aging. The measurements were initiated when the capacitors were removed from the furnace at about 4 hours after completion of peak firing cycle (970° C.). The aging rate reported is the change in capacitance between the value at 4 hours and that after 4968 hours (storage at room temperature).

TABLE IV

| | FIRED CAPACITOR PROPERTIES | | | | |
|---|---|---|---|---|---|
| | | Initial (4 Hr.) | | | |
| Example | No. of Samples | K | C (nf) | DF (%) | $\Delta$ C (%)* |
| 8 | 5** | 6000 | 330 | 1.72 | −0.7 |
| 9 | 3 | 4900 | 268 | 1.05 | −1.1 |
| 10 | 6 | 6200 | 342 | 1.79 | −0.5*** |

*Between 4 hours and 4968 hours.
**A sixth capacitor exhibited shorting, apparently due to a problem in the electroding or dicing step.
***One of these six capacitors exhibited a $\Delta$ C of −2.1% apparently due to a processing irregularity, but even including this capacitor, the average for all six was −0.5%.

These data illustrate the excellent performance of the capacitors of this invention on terms of aging rate, i.e., a change in capacitance with time per decade in hours of about 1.5% or less, when measured at room temperature, and often less than about 1%, even at high K (above 4000).

We claim:

1. A monolithic ceramic capacitor comprising a plurality of superimposed alternating layers of a dielectric composition and metal electrodes bonded together into a unitary body, the capacitor having a dielectric constant of at least 1000 and a dissipation factor of less than 5% and exhibiting a change in capacitance, at room temperature with time of about 1.5% or less per decade in hours even at a dielectric constant of 4000, the capacitor having been fired at a low temperature of 1050° C. or less in air, the electrodes being substantially embedded in the dielectric and having a melting point less than about 1050° C., the dielectric composition having the formula

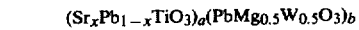

$(Sr_xPb_{1-x}TiO_3)_a(PbMg_{0.5}W_{0.5}O_3)_b$ wherein
x is 0–0.10,
a is 0.35–0.5,
b is 0.5–0.65, and
a plus b equals one
and the metal electrodes comprise silver.

2. A capacitor according to claim 1 where in the dielectric composition a is 0.35–0.45 and b is 0.55–0.65.

3. A capacitor according to claim 1 where in dielectric composition x is 0.

4. A capacitor according to claim 2 where in the dielectric composition x is 0.

5. A capacitor according to claim 1 where in the dielectric composition x is 0.01–0.08.

6. A capacitor according to claim 2 where in the dielectric composition x is 0.01–0.08.

7. A capacitor according to claim 1 wherein the metal electrodes are Pd/Ag.

8. A capacitor according to claim 1 having a dielectric constant of at least 4000 exhibiting a change in capacitance of about 1% or less per decade in hours.

9. A capacitor according to claim 2 having a dielectric constant of at least 4000 exhibiting a change in capacitance of about 1% or less per decade in hours.

10. A capacitor according to claim 7 wherein the Pd/Ag electrodes contain no more than 20% Pd based upon the total weight of palladium and silver.

* * * * *